(12) United States Patent
Kuwabara

(10) Patent No.: US 10,807,587 B2
(45) Date of Patent: Oct. 20, 2020

(54) HYBRID VEHICLE

(71) Applicant: SUBARU CORPORATION, Tokyo (JP)

(72) Inventor: Kosuke Kuwabara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 298 days.

(21) Appl. No.: 15/942,907

(22) Filed: Apr. 2, 2018

(65) Prior Publication Data
US 2018/0297579 A1 Oct. 18, 2018

(30) Foreign Application Priority Data

Apr. 17, 2017 (JP) .................................. 2017-081515

(51) Int. Cl.
*B60W 20/13* (2016.01)
*B60W 10/08* (2006.01)
(Continued)

(52) U.S. Cl.
CPC ............ *B60W 20/13* (2016.01); *B60W 10/06* (2013.01); *B60W 10/08* (2013.01); *B60W 20/16* (2016.01); *B60W 30/18072* (2013.01); *B60W 30/188* (2013.01); *B60W 2510/068* (2013.01); *B60W 2510/0676* (2013.01);
(Continued)

(58) Field of Classification Search
CPC ...... B60W 20/13; B60W 10/08; B60W 10/06; B60W 30/188; B60W 2520/105; B60W 2510/0676; B60W 2710/0666; B60W 2710/08; B60W 2510/244; Y10S 903/906; Y10S 903/905
See application file for complete search history.

(56) References Cited

U.S. PATENT DOCUMENTS 6,032,753 A * 3/2000 Yamazaki ............ F02D 41/005
180/65.235
8,650,860 B2 * 2/2014 Applegate ............ F01N 3/2013
60/295
(Continued)

FOREIGN PATENT DOCUMENTS

JP 2010-013976 A 1/2010
JP 2010-090730 A 4/2010
(Continued)

OTHER PUBLICATIONS

Office Action received in Japanese Patent Application No. 2017-081515 dated Feb. 19, 2019 (4 pages in Japanese with machine translation).

*Primary Examiner* — Ramsey Refai
(74) *Attorney, Agent, or Firm* — Smith, Gambrell & Russell, LLP

(57) ABSTRACT

A hybrid vehicle includes: an engine; a catalyst; a motor generator; and a drive control unit. The catalyst is provided in an exhaust path of the engine. The motor generator is coupled to the engine and capable of regenerating electric power. The drive control unit is configured to increase torque output from the engine and cause the motor generator to regenerate the electric power by using the torque output from the engine in the case where the hybrid vehicle is in a deceleration state and a temperature of the catalyst is lower than a specified catalyst activation temperature.

4 Claims, 3 Drawing Sheets

(51) Int. Cl.
*B60W 10/06* (2006.01)
*B60W 20/16* (2016.01)
*B60W 30/18* (2012.01)
*B60W 30/188* (2012.01)

(52) U.S. Cl.
CPC . *B60W 2510/244* (2013.01); *B60W 2510/246* (2013.01); *B60W 2520/105* (2013.01); *B60W 2710/06* (2013.01); *B60W 2710/0666* (2013.01); *B60W 2710/08* (2013.01); *Y10S 903/905* (2013.01); *Y10S 903/906* (2013.01)

(56) References Cited

U.S. PATENT DOCUMENTS

| | | | |
|---|---|---|---|
| 8,751,081 B2 * | 6/2014 | Kato | B60K 6/445 |
| | | | 701/22 |
| 2009/0118091 A1 * | 5/2009 | Lahti | B60W 10/06 |
| | | | 477/100 |
| 2012/0323419 A1 * | 12/2012 | Hashimoto | B60K 6/445 |
| | | | 701/22 |
| 2018/0087424 A1 | 3/2018 | Wakamatsu et al. | |
| 2018/0297579 A1 * | 10/2018 | Kuwabara | B60W 20/13 |

FOREIGN PATENT DOCUMENTS

| | | |
|---|---|---|
| JP | 2012-86735 A | 5/2012 |
| JP | 2015-120482 A | 7/2015 |
| JP | 2016-200112 A | 12/2016 |

\* cited by examiner

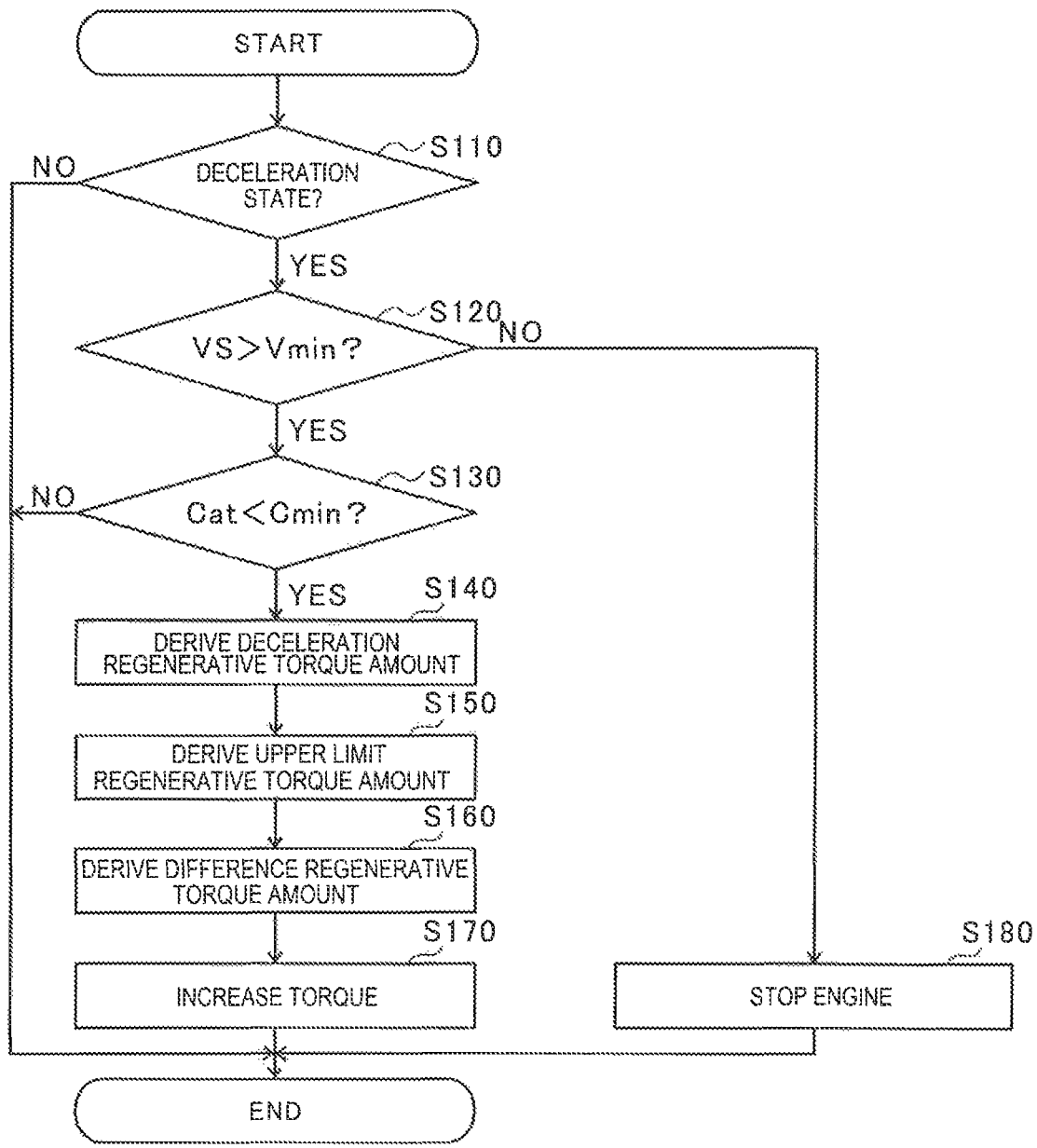

HYBRID VEHICLE

CROSS-REFERENCE TO RELATED APPLICATIONS

The present application claims priority from Japanese Patent Application No. 2017-081515 filed on Apr. 17, 2017, the entire contents of which are hereby incorporated by reference.

BACKGROUND

1. Technical Field

The present invention relates to a hybrid vehicle that drives drive wheels by using an engine and a motor generator.

2. Related Art

Conventionally, a hybrid vehicle that includes an engine and a motor generator as drive sources and drives drive wheels by using the engine and the motor generator has been known (for instance, Japanese Unexamined Patent Application Publication (JP-A) No. 2012-86735). In such a hybrid vehicle, the motor generator and the drive wheel are coupled to each other via a power transmission path, and this power transmission path and the engine are coupled to each other via a clutch. When the clutch is disengaged, an EV travel mode in which the vehicle travels using the motor generator only is executed. When the clutch is engaged, a HEV mode in which the vehicle travels using the motor generator and the engine is executed.

SUMMARY OF THE INVENTION

An aspect of the present invention provides a hybrid vehicle including: an engine; a catalyst provided in an exhaust path of the engine; a motor generator coupled to the engine and capable of regenerating electric power; and a drive control unit configured to increase torque output from the engine and cause the motor generator to regenerate the electric power by using the torque output from the engine in a case where the hybrid vehicle is in a deceleration state and a temperature of the catalyst is lower than a specified catalyst activation temperature.

BRIEF DESCRIPTION OF THE DRAWINGS

FIG. 3 is a flowchart illustrating a procedure of a catalyst warming processing executed by the hybrid vehicle.

DETAILED DESCRIPTION

Figure 1:
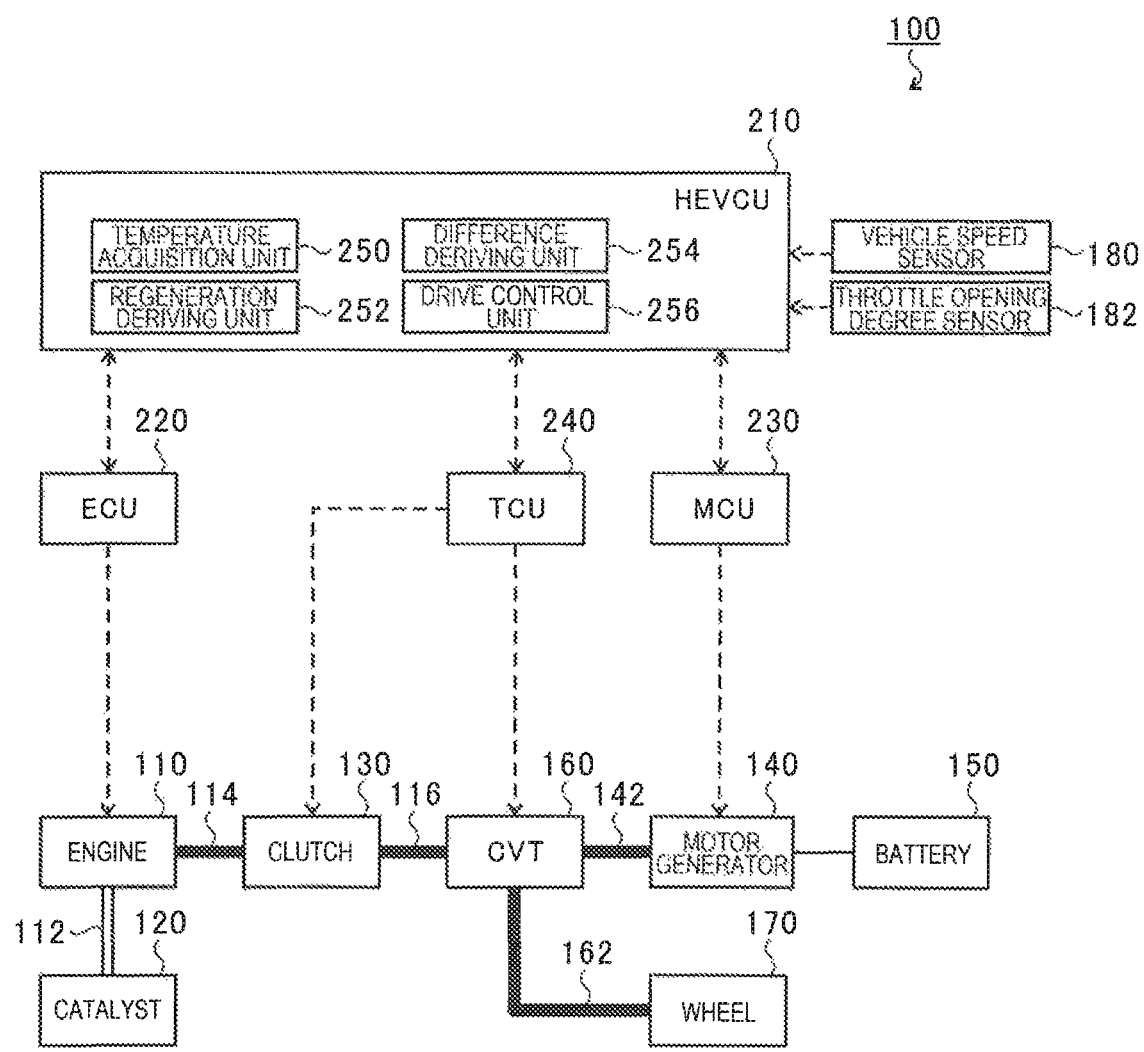
FIG. 1 is a diagram illustrating a configuration of a hybrid vehicle.

A preferred example of the present invention will now be described in detail with reference to the accompanying drawings. The dimensions, materials, specific numerical values, and the like illustrated in such an example are merely for facilitating understanding of the invention, and do not limit the present invention unless otherwise noted. In the present specification and drawings, elements having substantially the same function and configuration are denoted by the same reference numeral and redundant explanations are omitted. Elements not directly related to the present invention are not illustrated.

A hybrid vehicle that includes an engine or the like is provided with a catalyst to purify pollutants that are contained in exhaust gas discharged from the engine. Within a specified activation temperature range, the catalyst removes the pollutants. Accordingly, in a deceleration state where an amount of the exhaust gas is small or the exhaust gas is not produced, such a problem occurs that a temperature of the catalyst becomes lower than the activation temperature and pollutant removal efficiency by the catalyst is degraded.

It is desirable to provide a hybrid vehicle capable of preventing a temperature decrease of a catalyst even in a deceleration state.

FIG. 1 is a diagram illustrating a configuration of a hybrid vehicle 100. In FIG. 1, a signal flow is indicated by broken arrows.

As illustrated in FIG. 1, an engine 110 that constitutes the hybrid vehicle 100 (the vehicle) is configured as a gasoline engine or a diesel engine. The engine 110 acquires a driving force (torque) when fuel is burned in a combustion chamber, which is not illustrated. Exhaust gas produced in the combustion chamber of the engine 110 is discharged to the outside through an exhaust path 112. A catalyst 120 is provided in the exhaust path 112. The catalyst 120 is a three-way catalyst, for instance, and purifies pollutants (hydrocarbon (HC), carbon monoxide (CO), and nitrogen oxide (NOx)) that are contained in the exhaust gas.

The driving force that is acquired by the engine 110 is output to a continuously variable transmission (CVT) 160 via a crankshaft 114 and an input shaft 116. A clutch 130 is provided between the crankshaft 114 and the input shaft 116.

A motor generator 140 is coupled to a battery 150 for driving the hybrid vehicle 100 and, when receiving electric power from the battery 150, transmits the driving force (torque) to a motor rotating shaft 142 (a drive shaft 162). In addition, instead of a brake or with the brake, the motor generator 140 applies a braking force to the hybrid vehicle 100 during deceleration of the hybrid vehicle 100, receives the torque from the drive shaft 162 (the motor rotating shaft 142), and thereby generates (regenerates) the electric power. The motor rotating shaft 142 is coupled to the input shaft 116 via the continuously variable transmission 160.

The battery 150 supplies the electric power to the motor generator 140 and stores the electric power that is regenerated by the motor generator 140.

The continuously variable transmission 160 is configured by including a primary pulley, a secondary pulley, and a belt. The input shaft 116 is fixed to the primary pulley of the continuously variable transmission 160, the drive shaft 162 is fixed to the secondary pulley, and the belt is wound around the primary pulley and the secondary pulley. When a gap between the primary pulley and the secondary pulley is changed, the torque generated by the engine 110 and the motor generator 140 is changed seamlessly and is then transmitted to the drive shaft 162.

A wheel 170 is coupled to the drive shaft 162, and the torque (transmission power), a magnitude of which is changed by the continuously variable transmission 160, is transmitted to the wheel 170. In addition, the drive shaft 162 transmits torque that is generated by rotation of the wheel 170 to the motor rotating shaft 142 via the continuously variable transmission 160.

A hybrid and electric vehicle control unit (HEVCU) 210 is constructed of a microcomputer that includes a central processing unit (CPU), random access memory (RAM), and read only memory (ROM), and integrally controls each unit of the hybrid vehicle 100. Based on a depression amount of an accelerator pedal, a depression amount of a brake pedal, a shift position of a shift lever, a vehicle speed received from a vehicle speed sensor 180, a throttle opening degree received from a throttle opening degree sensor 182, and the like, the HEVCU 210 appropriately controls driving of the engine 110 and the motor generator 140 via an engine control unit (ECU) 220 and a motor control unit (MCU) 230, respectively.

The ECU 220 is constructed of a microcomputer that includes a CPU, RAM, and ROM, and executes drive control of the engine 110 on the basis of the control by the HEVCU 210. The MCU 230 is constructed of a microcomputer that includes a CPU, RAM, and ROM, and executes drive control and regenerative control of the motor generator 140 on the basis of the control by the HEVCU 210.

A transmission control unit (TCU) 240 is constructed of a microcomputer that includes a CPU, RAM, and ROM, and switches between an engaged state and disengaged state of the clutch 130 on the basis of the control by the HEVCU 210. In addition, the TCU 240 controls driving of the continuously variable transmission 160.

Figure 2A:
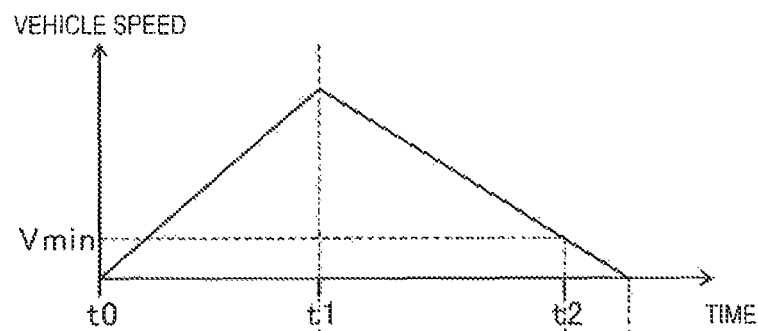
FIGS. 2A to 2D are graphs illustrating a vehicle speed, a regenerative torque amount, a catalyst temperature, and an engine speed at a time when a catalyst warming processing is executed by a HEVCU.
Figure 2B:
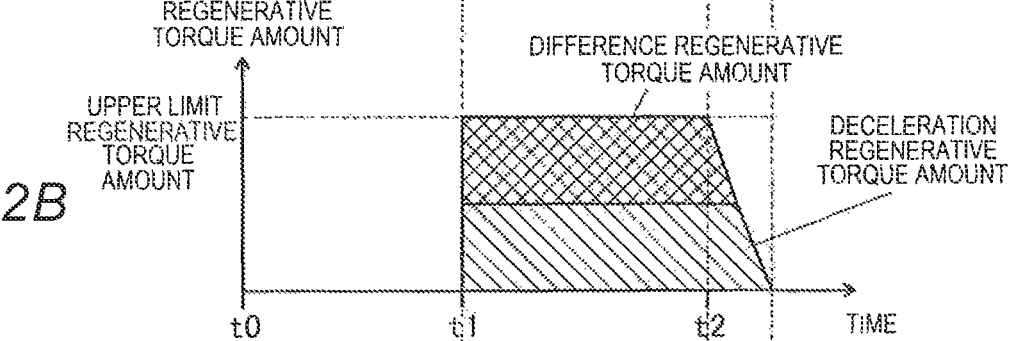
Figure 2C:
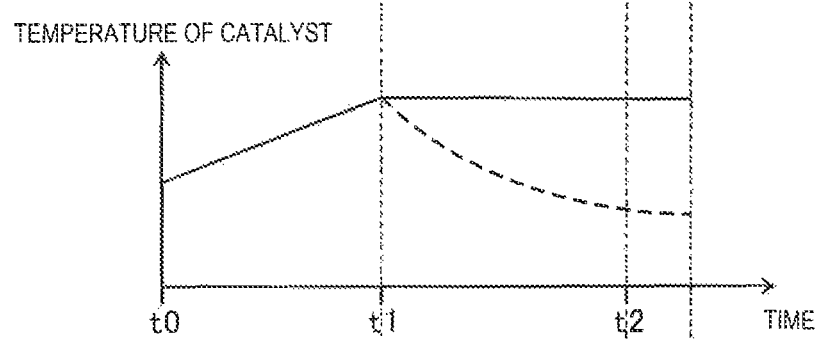
Figure 2D:
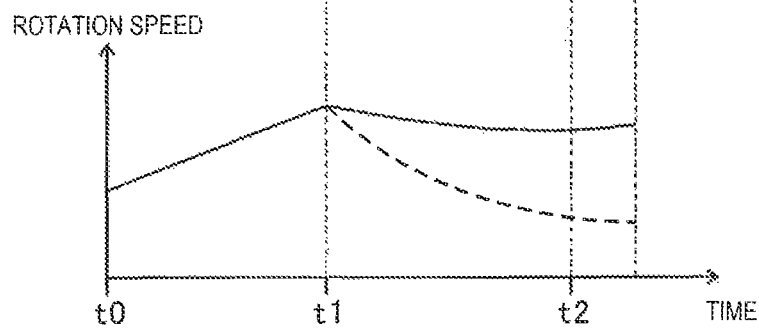

FIGS. 2A to 2D are graphs illustrating the vehicle speed, a regenerative torque amount, a temperature of the catalyst 120, and a rotation speed of the engine 110 at a time when the HEVCU 210 executes a catalyst warming processing. In FIG. 2A, a vertical axis represents the vehicle speed (km/h), and a horizontal axis represents time. In FIG. 2B, a vertical axis represents the regenerative torque amount (N/m), and a horizontal axis represents the time. In FIG. 2C, a vertical axis represents the temperature (° C.) of the catalyst 120, and a horizontal axis represents the time. In FIG. 2D, a vertical axis represents the rotation speed (rpm) of the engine 110, and a horizontal axis represents the time.

As illustrated in FIG. 2A, the hybrid vehicle 100 is in an acceleration state from time t0 to time t1. In this case, as illustrated in FIG. 2B, the regenerative torque amount by the motor generator 140 is 0 N/m from the time t0 to the time t1. In addition, as illustrated in FIG. 2D, the rotation speed of the engine 110 is increased with a time lapse from the time t0 to the time t1. Accordingly, with the time lapse from the time t0 to the time t1, an amount of the exhaust gas is increased, and the catalyst temperature is increased by the exhaust gas. Thus, as illustrated in FIG. 2C, the temperature of the catalyst 120 is increased with the time lapse from the time t0 to the time t1.

At the time t1, the hybrid vehicle 100 is switched from the acceleration state to a deceleration state. As illustrated in FIG. 2B, the motor generator 140 regenerates the electric power (hatched in FIG. 2B) in accordance with rotation of the wheel 170. Here, the motor generator 140 regenerates the electric power, an amount of which corresponds to the regenerative torque amount determined by the HEVCU 210 on the basis of the depression amount of the brake pedal and the vehicle speed.

In the related art in which the engine 110 (the crankshaft 114) and the input shaft 116 are uncoupled from each other by the clutch 130 in the deceleration state, the engine 110 is brought into an idling state or is not supplied with the fuel. Thus, as indicated by a broken line in FIG. 2D, the rotation speed of the engine 110 is reduced. That is, in the related art, in the case where the vehicle is in the deceleration state, the fuel is not burned in the combustion chamber of the engine, or the exhaust gas amount is smaller than that in the acceleration state. Thus, as indicated by a broken line in FIG. 2C, the temperature of the catalyst 120 is decreased.

In view of the above, in this example, the HEVCU 210 drives the engine 110 in the deceleration state to execute the warming processing of the catalyst 120. More specifically, in this example, the HEVCU 210 also functions as a temperature acquisition unit 250, a regeneration deriving unit 252, a difference deriving unit 254, and a drive control unit 256.

The temperature acquisition unit 250 acquires the temperature of the catalyst 120. More specifically, in this example, the temperature acquisition unit 250 estimates the temperature of the catalyst 120 on the basis of the rotation speed of the engine 110 acquired from the ECU 220 and the throttle opening degree (an air amount) acquired from the throttle opening degree sensor 182. In addition, the temperature acquisition unit 250 acquires a temperature of the battery 150 from the MCU 230.

In the case of the deceleration state, the regeneration deriving unit 252 derives the regenerative torque amount (a deceleration regenerative torque amount) of the electric power generated by the motor generator 140 (hatched in FIG. 2B). More specifically, in this example, the regeneration deriving unit 252 derives the deceleration regenerative torque amount on the basis of the depression amount of the brake pedal and the vehicle speed. For instance, a map in which the depression amount of the brake pedal and the vehicle speed correlate with each other is stored in memory, which is not illustrated. Then, the regeneration deriving unit 252 refers to the map to derive the deceleration regenerative torque amount.

In the case where the temperature of the catalyst 120 acquired by the temperature acquisition unit 250 is lower than a specified catalyst activation temperature, the difference deriving unit 254 derives a difference regenerative torque amount that is a difference between a specified upper limit regenerative torque amount and the deceleration regenerative torque amount. The catalyst activation temperature is a lower limit value within an activation temperature range of the catalyst 120, for instance. The upper limit regenerative torque amount is a value that is smaller than an upper limit value of the regenerative torque amount of the motor generator 140, and is determined to such a value that the battery 150 is not overcharged, for instance, on the basis of the temperature, a state of charge (SOC), and a safety factor of the battery 150.

In the case where the hybrid vehicle 100 is in the deceleration state (from the time t1 to time t2) and the temperature of the catalyst 120 acquired by the temperature acquisition unit 250 is lower than the catalyst activation temperature, the drive control unit 256 controls the ECU 220 so as to increase the torque output from the engine 110 by the difference regenerative torque amount (cross-hatched in FIG. 2B). In addition, the drive control unit 256 controls the MCU 230 such that the motor generator 140 regenerates the electric power by using the torque output from the engine 110.

As it has been described so far, according to the hybrid vehicle 100 in this example, in the case of the deceleration state, the torque output from the engine 110 can be increased (indicated by a solid line in FIG. 2D), and the amount of the exhaust gas can be increased. Accordingly, the catalyst 120 can be warmed by heat of the exhaust gas. Thus, as indicated by a solid line in FIG. 2C, the temperature decrease of the catalyst 120 can be prevented, and degradation of activity efficiency of the catalyst 120 can be prevented.

Since the upper limit regenerative torque amount is determined on the basis of the temperature, the SOC (capacity of the battery 150), and the safety factor of the battery 150, a situation where the battery 150 is overcharged can be avoided. Thus, degradation of the battery 150 can be prevented.

The drive control unit 256 controls the ECU 220 to delay ignition timing in the combustion chamber of the engine 110 from the ignition timing in the case where the hybrid vehicle 100 is not in the deceleration state. In this way, a temperature of the exhaust gas can be increased by degrading combustion efficiency. Accordingly, the catalyst 120 can efficiently be warmed.

(Catalyst Warming Processing)

Next, the catalyst warming processing by using the above hybrid vehicle 100 will be described. FIG. 3 is a flowchart illustrating a procedure of a catalyst warming processing executed by the hybrid vehicle 100. The catalyst warming processing is executed as interrupting processing at specified time intervals.

(Deceleration State Determination Processing S110)

The HEVCU 210 determines whether the hybrid vehicle 100 is in the deceleration state. More specifically, the HEVCU 210 determines that the hybrid vehicle 100 is in the deceleration state in the cases where the depression amount of the accelerator pedal is 0 and the depression amount of the brake pedal is positive. Consequently, if it is determined that the hybrid vehicle 100 is in the deceleration state, the processing proceeds to a vehicle speed determination processing S120. If it is determined that the hybrid vehicle 100 is not in the deceleration state, the catalyst warming processing is no longer executed.

(Vehicle Speed Determination Processing S120)

The HEVCU 210 determines whether a vehicle speed VS received from the vehicle speed sensor 180 exceeds a specified vehicle speed lower limit value Vmin. Consequently, if it is determined that the vehicle speed VS exceeds the vehicle speed lower limit value Vmin, the processing proceeds to a catalyst temperature determination processing S130. If it is determined that the vehicle speed VS is equal to or lower than the vehicle speed lower limit value Vmin (the time t2 in FIG. 2A), the processing proceeds to an engine stop processing S180.

(Catalyst Temperature Determination Processing S130)

The difference deriving unit 254 determines whether a temperature Cat of the catalyst 120 acquired by the temperature acquisition unit 250 is lower than a catalyst activation temperature Cmin. Consequently, if it is determined that the temperature Cat of the catalyst 120 is lower than the catalyst activation temperature Cmin, the processing proceeds to deceleration regenerative torque amount derivation processing S140. If it is determined that the temperature Cat of the catalyst 120 is not lower than the catalyst activation temperature Cmin, the catalyst warming processing is no longer executed.

(Deceleration Regenerative Torque Amount Derivation Processing S140)

The regeneration deriving unit 252 derives the deceleration regenerative torque amount on the basis of the depression amount of the brake pedal and the vehicle speed.

(Upper Limit Regenerative Torque Amount Derivation Processing S150)

The difference deriving unit 254 derives the upper limit regenerative torque amount on the basis of the temperature, the SOC, and the safety factor of the battery 150.

(Difference Regenerative Torque Amount Derivation Processing S160)

The difference deriving unit 254 derives the difference regenerative torque amount that is the difference between the upper limit regenerative torque amount derived in the above upper limit regenerative torque amount derivation processing S150 and the deceleration regenerative torque amount derived in the above deceleration regenerative torque amount derivation processing S140.

(Torque Increase Processing S170)

The drive control unit 256 increases the torque output from the engine 110 by the difference regenerative torque amount and causes the motor generator 140 to regenerate the electric power by using the torque output from the engine 110.

(Engine Stop Processing S180)

The drive control unit 256 stops the engine 110 via the ECU 220 and reduces the regenerative torque amount in the motor generator 140. With the stop of the engine 110, the difference regenerative torque amount is also reduced in a collaborated manner with reduction of the torque output from the engine 110. In the case where the deceleration state continues even after the torque output from the engine 110 and the difference regenerative torque amount become zero, the deceleration regenerative torque amount is derived in accordance with the depression amount of the brake pedal and the vehicle speed, and the motor generator 140 regenerates the electric power. In this way, the regenerative torque amount is gradually reduced.

Although the preferred example of the present invention with reference to the accompanying drawings has been described, the present invention is not limited to such an example. Provided a person has ordinary knowledge in the technical field to which the example of the present invention pertains, within the scope of the technical idea described in the claims, the example of the present invention is intended to cover various modifications and applications, and such modifications and applications are intended to fall within the technical scope of the present invention.

In the above example, the configuration in which the temperature acquisition unit 250 estimates the temperature of the catalyst 120 on the basis of the rotation speed of the engine 110 acquired from the ECU 220 and the throttle opening degree (the air amount) has been described as an instance. However, in the case where a temperature sensor is provided to measure the temperature of the catalyst 120, the temperature acquisition unit 250 may acquire the temperature (an actually measured value) of the catalyst 120 that is measured by the temperature sensor.

In the above example, the configuration in which the upper limit regenerative torque amount is determined on the basis of the temperature, the SOC, and the safety factor of the battery 150 has been described as an instance. However, the upper limit regenerative torque amount may be determined on the basis of the temperature of the catalyst 120 and the catalyst activation temperature. More specifically, in the case where the upper limit regenerative torque amount is smaller than a maximum regenerative torque amount of the motor generator 140, the upper limit regenerative torque amount may be determined on the basis of the torque of the engine 110 with which the amount (the temperature) of the exhaust gas required to increase the temperature of the catalyst 120 to the catalyst activation temperature is produced.

In the case where a maximum torque amount that can be output by the engine 110 is smaller than the difference regenerative torque amount, the drive control unit 256 may drive the engine 110 at the maximum torque. In addition, in the case where the maximum torque amount that can be output by the engine 110 is smaller than the difference regenerative torque amount, upper limit torque may be set for each rotation speed of the engine 110, so as to prevent output of the torque, the amount of which is equal to or larger than the amount with which optimum fuel efficiency is achieved (the amount of which degrades the fuel economy). Then, the drive control unit 256 may drive the engine 110 at the upper limit torque.

The HEVCU 210 may not execute the above catalyst warming processing during rapid braking. Note that the HEVCU 210 may determine the rapid braking on the basis of the depression amount of the brake pedal and brake hydraulic pressure or may determine the rapid braking on the basis of a gradient estimation value that is estimated from a measurement value of a gravity sensor.

The present invention can be used for a hybrid vehicle that drives drive wheels by using an engine and a motor generator.

The invention claimed is:

1. A hybrid vehicle comprising:
 an engine;
 a catalyst provided in an exhaust path of the engine;
 a motor generator coupled to the engine and capable of regenerating electric power;
 a drive control unit configured to increase torque output from the engine and cause the motor generator to regenerate the electric power by using the torque output from the engine in a case where the hybrid vehicle is in a deceleration state and a temperature of the catalyst is lower than a specified catalyst activation temperature;
 a regeneration deriving unit configured to derive a regenerative torque amount by the motor generator in the case where the hybrid vehicle is in the deceleration state; and
 a difference deriving unit configured to derive a difference regenerative torque amount that is a difference between a specified upper limit regenerative torque amount and the regenerative torque amount derived by the regeneration deriving unit, wherein
 the drive control unit increases the torque output from the engine by the difference regenerative torque amount.

2. The hybrid vehicle according to claim 1 further comprising:
 a battery configured to supply electric power to the motor generator and store the electric power regenerated by the motor generator, wherein
 the upper limit regenerative torque amount is determined on a basis of a temperature of the battery and a capacity of the battery.

3. The hybrid vehicle according to claim 1, wherein the upper limit regenerative torque amount is determined on a basis of the temperature of the catalyst and the catalyst activation temperature.

4. The hybrid vehicle according to claim 1, wherein the drive control unit delays ignition timing in a combustion chamber of the engine from ignition timing in a case where the hybrid vehicle is not in the deceleration state.

* * * * *